May 17, 1966   R. TATSCH   3,251,613
FLEXIBLE INTERCONNECTING MEANS FOR RIGID, SELF-INSULATED, AIR
CONDUITS
Original Filed Oct. 10, 1960   2 Sheets-Sheet 1
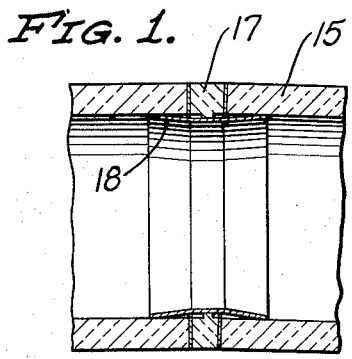
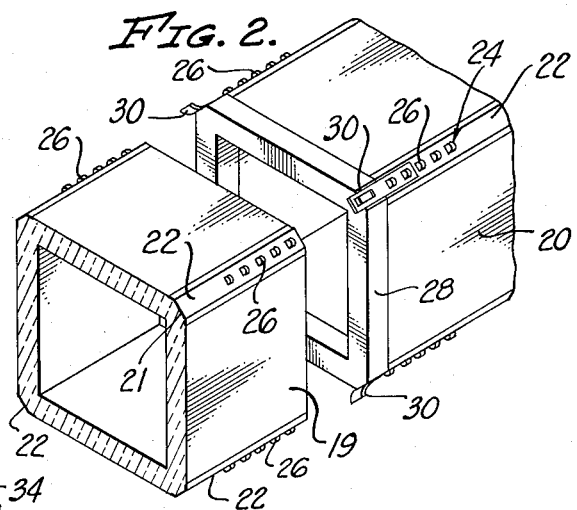
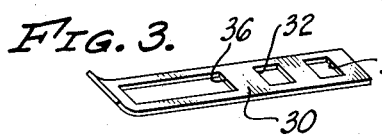
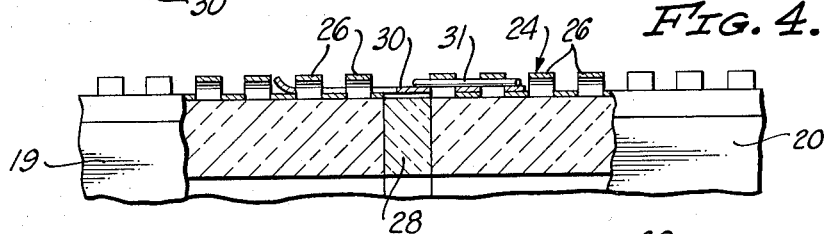
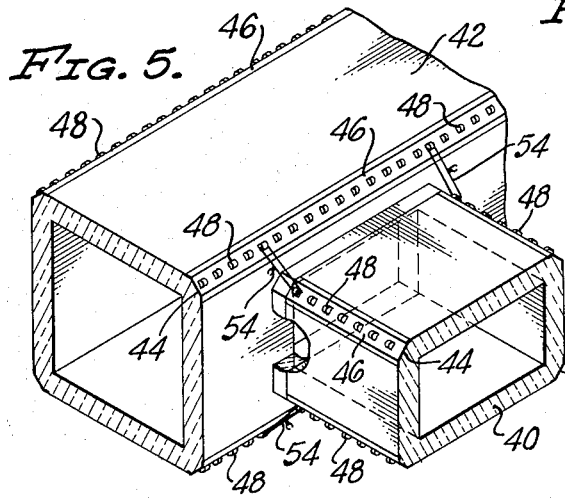
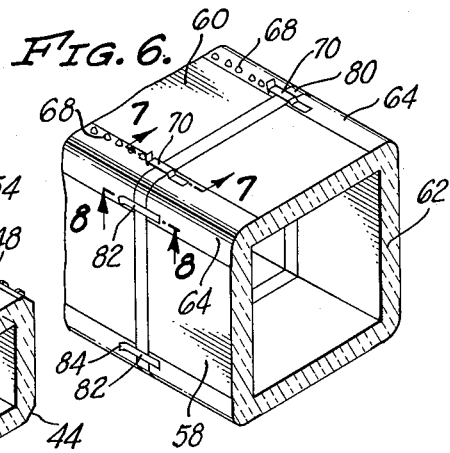
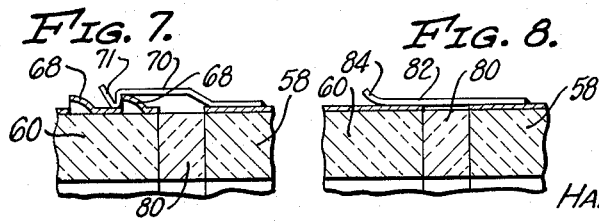
INVENTOR
RICHARD TATSCH
BY HIS ATTORNEYS
HARRIS, KIECH, RUSSELL & KERN

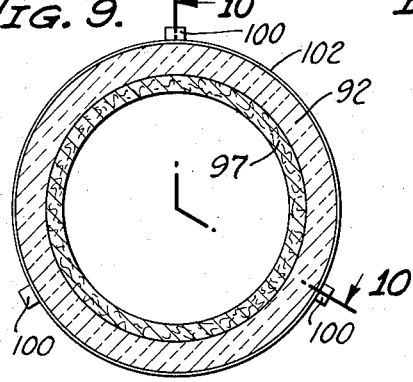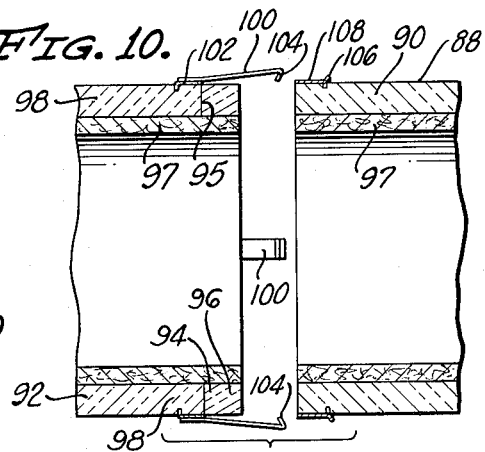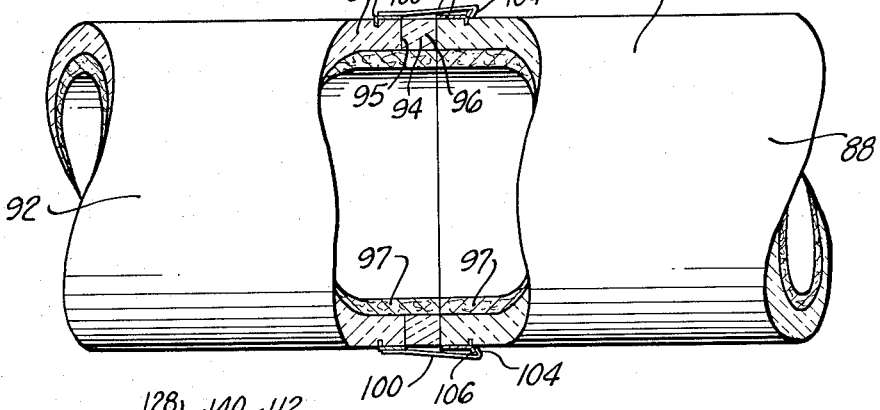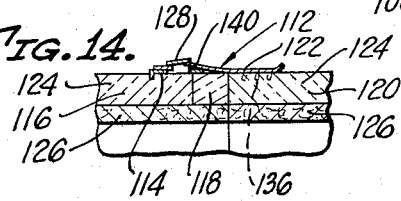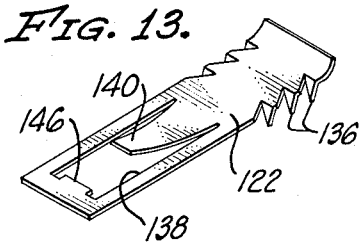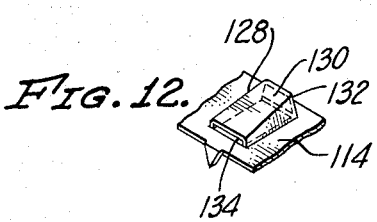

United States Patent Office 3,251,613
Patented May 17, 1966

3,251,613
FLEXIBLE INTERCONNECTING MEANS FOR RIGID, SELF-INSULATED, AIR CONDUITS
Richard Tatsch, 1410 W. 6th St., Silver City, N. Mex.
Continuation of abandoned application Ser. No. 61,611, Oct. 10, 1960. This application Mar. 4, 1964, Ser. No. 349,337
2 Claims. (Cl. 285—49)

The present application is a continuation of application Serial Number 61,611, filed October 11, 1960, and now abandoned.

This invention relates to air conduit construction and more particularly provides an improved means for interconnecting adjoining air conduit segments or members. The interconnecting means of the invention is particularly suitable to the coupling together of air conduit segments having rigid structures.

Self-insulated air conduit segments possess thick walls, which result in rigid structures. The interconnecting means commonly employed for coupling of thick walled, rigid segments are most often of a nonflexible nature. Slip joints of a telescoping type are sometimes employed as interconnecting means but even with such a construction movement is limited to an axial direction of the erected conduit. Conduit installations are occasionally subjected to external forces which may, in the case of a fully rigid construction, damage the connections between the conduit segments, resulting in air leakage at the damaged sites. At time of installation, it may become necessary to shorten a conduit segment by cutting the segment at the installation site. Field cutting, being at its best of a rough nature, frequently results in the conduit segment's having an irregular end. It will be appreciated that when regular and irregular ends are abutted, a gap in the installation may well occur, and the likelihood of air leakage is thereby increased.

Air conduit connecting means now generally available lack a length compensating feature. Such a length compensating provision is an important consideration where conduit segments are assembled between fixed dimensional confines since it is sometimes difficult to cut a segment to an exact length. Conventional coupling means normally require that the adjoining conduit segments be spaced more or less an exact distance from each other. This requirement complicates field installation.

The improved means of the invention for interconnecting adjoining air conduit segments or members provides a flexible coupling that will compensate for limited distortion of the erected air conduit. The improved coupling means facilitates the joining together of conduit segments spaced apart a somewhat greater or smaller distance than normal. The coupling means of the invention makes easier the joining of conduits having irregular ends. Broadly speaking, the improved coupling means comprises a flexible, rubber-like structure, which is placed between the adjoining air conduit members. The flexible rubber-like structure has a central passageway extending between openings at its two opposite faces. The flexible structure is normally relatively thin, generally resembling a thick gasket and is characterized by a high degree of resiliency. The two facial openings of the flexible gasket structure generally conform in configuration and are in direct communication with the respective openings of the two adjoining air conduit members. The flexible rubber-like structure may be held under some compression between the two adjoining air conduit members, in which event it may not be necessary to bond the flexible structure to the respective conduit members. The compression is insufficient to collapse any significant number of the cells of the rubber-like structure so as to appreciably alter the insulation properties of the structure. However, as a general practice and a precautionary measure, the flexible structure will be bonded to the adjoining conduit members. The flexible, rubber-like structure is preferably formed of a plastic (synthetic resin) foam material such as polyurethane. The use of a plastic foam because of its cellular structure, provides continuity in the insulation.

In a preferred structure, a positive locking means is provided for tying the adjoining conduit members together. In one embodiment, the positive locking means takes the form of a metal band having a series of spaced, retaining means running longitudinally of the band. Such a band is fastened to each of the two adjoining conduit members, with the two metal bands being preferably in alignment with each other. A securing member is provided for engaging at least some of the retaining means of each of the two metal bands, thereby effecting a locking of the two conduit members together. Preferably, the spaced retaining means of each of the metal bands take the form of a series of spaced projections and the securing member is preferably a metal detent having spaced holes for receiving and holding projections of the two metal bands.

Various plastic foam materials of a flexible nature are available for use in the construction of the rubber-like structure; for example, flexible polyurethane and similar foam structures. Polyurethane structures formed by molding possesses a thin outer skin that is relatively impermeable to moisture vapor migration. A vinyl coating applied to the flexible plastic foam structure will also lessen moisture vapor migration. Particularly desirable flexible rubber-like structures include the foamed vinyl compositions. The details of manufacturing the flexible foamed resins will not be discussed here as various foamed plastics are commercially available and the details of manufacture are well known. Foamed vinyl plastics are prepared from several of the available vinyl resins. Among the more suitable are polyvinyl acetate and polyvinyl chloride.

These and other advantages of the improved coupling means of the new invention will become more apparent in the following specification, wherein:

FIG. 1 is a longitudinal section of a circular conduit, illustrating one form of the interconnecting means of the invention for joining together abutting conduit segments;

FIG. 2 is an isometric view of two conduit segments of rectangular cross section positioned for joining together with another embodiment of the interconnecting means of the invention;

FIG. 3 is a detailed isometric view of a detent employed in the interconnecting means illustrated in FIG. 2;

FIG. 4 is a fragmentary sectional view of the interconnecting means of the assemblage of FIG. 2, showing two conduits interconnected using the detent of FIG. 3;

FIG. 5 is an isometric view, partially cut away, of a lateral conduit emanating from a main or trunk line conduit, wherein one embodiment of the interconnecting means of the invention is utilized for attachment of the lateral conduit to the trunk conduit;

FIG. 6 is an isometric view of still another assemblage, illustrating a different form of the coupling means of the invention;

FIG. 7 is a partial cross-sectional view taken along line 7—7 of FIG. 6, illustrating the manner in which the two conduit segments of FIG. 7 are held together;

FIG. 8 is another sectional view taken along line 8—8 of FIG. 6, showing the detail of a conduit aligning means of that assemblage;

FIG. 9 is a cross-sectional view through a circular conduit employing still another embodiment of the coupling means of the invention;

FIG. 10 is a fragmentary, longitudinal sectional view taken along line 10—10 of FIG. 9 disclosing the details of the coupling means;

FIG. 11 is another longitudinal view, partially in section, of the conduit of FIG. 10 with the adjoining conduit segments in an abutting position and with the coupling means holding them together;

FIG. 12 is an isometric view of one portion of another embodiment of the coupling means of the invention;

FIG. 13 is an isometric view of the other portion of the coupling means partially illustrated in FIG. 12; and FIG. 14 is a sectional view illustrating the coupling means of FIGS. 12 and 13 in its operative position.

With reference to FIG. 1, there are illustrated two adjoining conduit segments 15 and 16, joined together by an annular flexible, rubber-like gasket member 17, preferably formed of a plastic foam material, which is bonded at its opposite faces to the exposed ends of the adjoining cylindrical conduit segments 15 and 16. The flexible foam material used in the particular embodiment illustrated is a vinyl sponge capable of withstanding temperatures up to 225° F. and possessing a closed monocellular structure which is highly impermeable to the passage of water vapor. Other flexible rubber-like materials may be used, for example, flexible polyurethane. It will be desirable in some structures to employ an incombustible cover sleeve 18, normally formed of thin sheet metal, placed within the adjoining conduit segments 15 and 16 to prevent an internal flame source from reaching the gasket material in those instances where the flexible foam strucutre employed is not noncombustible. The metal sleeve construction may be optionally employed with the other conduit segments hereinafter described. As will be seen in FIG. 1, the structure has a considerable degree of flexibility. The use of the sponge rubber gasket 17 of this illustration and of the other embodiments of the invention greately facilitates field installations. Field cutting, resulting in a conduit segment having a somewhat irregular end is not nearly so objectionable, since the foam gasket structure is capable of joining regular and irregular ends without the likelihood of an air leak developing. The conduit segments 15 and 16 are desirably formed from a rigid plastic (synthetic resin) foam, such as a rigid polyurethane or the like. The flexible coupling structure of the invention may be, if desired, topped with vinyl tape to render it more moisture vapor impermeable.

Conduit segments 19 and 20 of FIG. 2 are both of rectangular cross-section and each has a thick wall construction with its respective corners being tapered or beveled to provide surfaces 21 for supporting a metal band 22 having spaced retaining means 24 in the form of raised projections 26. Each of the bands has one or more series of such projections 26. These projections 26 are conveniently formed by providing the metal band 22 with a series of pairs of closely spaced, parallel slits. The metal between each pair of slits is then forced outwardly to form loops which constitute the projections 26. A thick flexible, foam vinyl gasket member 28, having the same configuration and wall thickness as the conduit segments 19 and 20, is placed between the two segments and in the assemblage, as illustrated in FIG. 4, the foam vinyl member 28 is under some compression force. A securing member for engaging and for typing together the two metal bands 22 of the respective conduit segments 19 and 20 and hence for positive locking the two segments together, takes the form of a short metal detent 30 (see FIG. 3) having at one end two rectangular openings 32 and 34 adapted to receive and hold two projections 26 of one of the metal bands 22. A cotter key 31, as best seen in FIG. 4, passed through the two adjoining projections 26 secures the metal detent 30 to the metal band. The other end of the metal detent 30 is provided with a somewhat larger opening 36, also rectangular, which is adapted to hold at least one metal projection 26 of the other band 22 when the two adjoining conduit segments are locked together, as best seen in FIG. 4. The opening 36 of the metal detent 30 in being oversized, i.e. larger than a single projection, provides a degree of latitude in securing the two metal bands together.

Various means are available for fastening the bands 22 to the conduit segments and are determined principally by the materials employed in the construction of the conduit segments. For instance, where the conduit segment is made of rigid plastic foam, such as rigid polyurethane, the metal band may be affixed to the conduit segment by sharp barbs formed integrally on the underside of the band 22. Depending on the method of manufacture of the conduit segment, it is sometimes possible to adhere the metal band 22 to the conduit segment by positioning the metal band on the tacky foam before it has fully set.

The isometric view of FIG. 5 shows the application of the coupling means of the invention to interconnect a branch or lateral conduit 40 to a main or truck line conduit 42. In this installation the side of the trunk line conduit 42 has an opening cut into it of the same size as the internal cross section of the lateral conduit 40. Both the lateral conduit 40 and the trunk line conduit 42 have a rectangular cross section with their exterior corners being beveled to provide supporting surfaces 44 for metal bands 46, hereinbefore described. Each of the bands 46 carries a series of spaced projections 48 taking the form of loops lifted from the band itself. A foam rubber-like gasket structure 50 having the configuration of the cross section of the lateral conduit 40 is placed around the lateral opening of the trunk conduit 42 and between that conduit and the adjoining lateral conduit 40. The opposite surfaces of the foam gasket structure 50 are bonded with a suitable adhesive, e.g. a rubber base cement to the respective surfaces of the adjoining conduits. In this embodiment the means for positively securing the metal bands 44 of the two conduits 40 and 42 together are wires 54. The wires 54 are threaded through the loops provided by the projections 48.

The positive locking means for tying together adjoining conduit sections 58 and 60 of the air conduit construction of FIG. 6 takes still another form. In this embodiment two conduit sections have general rectangular cross-sections and they are provided with rounded external corners 62. Corner bands 64 formed of light weight steel are curved to seat on the rounded corners 62. The corner bands 64 at their opposite ends carry a series of spaced projections 68 and a snap locking means 70 made of spring steel. The snap locking means 70 adjacent its outer end is provided with an inwardly-extending detent or catch 71 for engaging in projection 68 of the opposing band 64. A flexible, foam rubber gasket, preferably of foam vinyl of the same wall thickness as the adjoining conduit segments 58 and 60 is placed therebetween. In the completed joint, the opposite faces of the foam gasket member 80 are bonded to the exposed ends of the adjoining segments 58 and 60. The structure of this embodiment is provided with a guide means 82 formed of spring steel and having a configuration, best seen in FIG. 8, which assists in the aligning of the adjoining conduit segments during their joining. The guide means 82 is preferably attached to the metal band 64 and extends across the foam gasket member 80 with its outer curved end 84 being in engagement with the wall of the adjoining conduit.

With reference to FIGS. 9, 10, and 11 there is illustrated a conduit 88 made up of two, adjoining circular cross section conduit segments 90 and 92 which are joined together through a flexible coupling means 94 made up of an annular, vinyl foam gasket member 96 bonded to exposed end 95 of conduit segment 92. Conduit 88 is provided with an inner, sound attenuating lining 97 formed, for example, of fiber glass or neoprene, which in the embodiment illustrated extends beyond outer wall 98 of the conduit segment 92 to provide a backing for the encircling, annular, foam vinyl gasket member 96. The positive locking means of this embodiment comprises several spring steel snap locking means 100 affixed, preferably by welding, to an annular band 102 of the conduit segment 92. The snap locking means 100 extend over the annular gasket member 94, being provided at their outer end with downwardly-extending detent portions 104. The detent portion 104 of each snap locking means 100, as best illustrated in FIG. 11, engages against the back side of a ridge portion 106 of an annular band 108 carried by the other conduit segment 90. This arrangement places the annular gasket member 94 under compression and there is no necessity to provide cement or other sealer on the abutting faces of the annular gasket member 94 and conduit segment 90.

FIGS. 12, 13 and 14 illustrate still another coupling means 112 which could be conveniently employed for fastening together the segments of a conduit of the type illustrated in FIGS. 9–11. The coupling means 112 comprises a metal band 114 encircling a conduit segment 116, a vinyl foam gasket member 118 placed between the segment 116 and a second conduit segment 120, and several metal detent members 122 carried by the segment 120. Conduit segments 116 and 120 have a rigid, plastic foam, outer wall 124 and an inner wall 126 made of glass fiber. The metal band 114 is provided with spaced projections or metal loops 128. The opposite ends of the loops 128 are open, as best seen in FIG. 12, with the upper surface 130 of each lug 128 sloping downwardly from loop end 132 to the other end 134. The detent member 122 is formed from an elongated piece of metal which at one end is provided with several barbs 136 for piercing and seating in outer wall 124 of the conduit segment 120. The opposite end of the detent member 122 is provided with an elongated opening or slot 138 and a flexible tongue 140 lifted out of the plane of the opening and extending over half of the length of the opening. The fixed end of the tongue 140 is adjacent the barbs 136. The end of the opening 138 farthest removed from the barbs 136 is provided with an inwardly extending projection 146 which serves a purpose hereinafter described. As best seen in FIG. 14, in its locked position, the metal detent member 122 is placed over the loop 128 with the tongue 140 engaging the inner side of the loop 128 at its end 132 and with projection 146 of the opening 138 engaging the loop 128 at its other end 134.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:
1. In air conduit construction, an improved means for interconnecting adjoining self-insulated thick walled air conduit members, said means providing a flexible coupling that will compensate for limited distortion of the air conduit, said means comprising:
   a flexible, compressible, plastic foam, rubber-like cellular structure disposed between adjoining air conduit members, said flexible structure having a central passageway extending between openings of its opposite two faces, said opening generally conforming in configuration and being in direct communication with the respective openings of the two adjoining air conduit members; and
   a positive locking means tying the adjoining conduit members together, said positive locking means having two metal bands, each having a series of spaced retaining means running longitudinally of the band, respectively fastened to the adjoining conduit members, and a securing member for engaging at least some of the retaining means of the two metal bands, thereby effecting a locking of the two conduit members together.

2. In air conduit construction, an improved means for interconnecting adjoining self-insulated thick walled air conduit members, said means providing a flexible coupling that will compensate for limited distortion of the air conduit, said means comprising:
   a flexible, compressible, plastic foam, rubber-like cellular structure disposed between adjoining air conduit members, said flexible structure having a central passageway extending between openings of its opposite two faces, said openings generally conforming in configuration and being in direct communication with the respective openings of the two adjoining air conduit members; and
   a positive locking means tying the adjoining conduit members together, said positive locking means having two metal bands, each having a series of spaced projections running longitudinally of the band, respectively fastened to the adjoining conduit members, said two metal bands being in alignment with each other, and a securing member for engaging at least some of the projections of the two metal bands, thereby effecting a locking of the two conduit members together, said securing member comprising a metal detent having spaced holes for receiving and holding projections of the two metal bands.

References Cited by the Examiner
UNITED STATES PATENTS

| | | | |
|---|---|---|---|
| 2,170,181 | 8/1939 | Allen | 285—231 |
| 2,898,741 | 8/1959 | Milliken | 285—305 |
| 2,964,424 | 12/1960 | Mast | 285—423 |

CARL W. TOMLIN, *Primary Examiner.*

S. R. MILLER, *Assistant Examiner.*